United States Patent [19]

Matles

[11] 4,419,305

[45] Dec. 6, 1983

[54] METHOD AND APPARATUS FOR WINDSHIELD REPAIR

[75] Inventor: William B. Matles, Philadelphia, Pa.

[73] Assignee: Glass Medic, Inc., Line Lexington, Pa.

[21] Appl. No.: 329,345

[22] Filed: Dec. 10, 1981

[51] Int. Cl.³ .................. B29C 27/00; B29C 1/00; B29G 3/00

[52] U.S. Cl. .................. 264/36; 156/94; 156/382; 264/102; 264/262; 264/267; 425/12; 425/13; 425/405 R; 425/DIG. 60

[58] Field of Search .................. 425/11–13, 425/405 R, DIG. 16; 264/36, 267, 261–263, 102; 156/94, 382

[56] References Cited

U.S. PATENT DOCUMENTS

| | | | |
|---|---|---|---|
| 1,580,689 | 4/1926 | Shoemaker | 249/66 |
| 3,562,366 | 2/1971 | Sohl | 264/23 |
| 3,765,975 | 10/1973 | Hollingsworth | 156/94 |
| 3,841,932 | 10/1974 | Forler et al. | 156/94 |
| 3,988,400 | 10/1976 | Luhman | 264/36 |
| 3,993,520 | 11/1976 | Werner et al. | 156/94 |
| 4,032,272 | 6/1977 | Miller | 425/12 |
| 4,047,863 | 9/1977 | McCluskey et al. | 425/13 |
| 4,132,516 | 1/1979 | Story | 425/13 |
| 4,165,397 | 8/1979 | Ogden et al. | 427/140 |
| 4,200,478 | 4/1980 | Jacino et al. | 156/94 |
| 4,249,869 | 2/1981 | Petersen | 425/13 |
| 4,280,861 | 7/1981 | Schwartz | 156/382 |

Primary Examiner—Willard E. Hoag
Attorney, Agent, or Firm—Howson and Howson

[57] ABSTRACT

A windshield repair device comprising a vacuum cup with a built-in piston and cylinder assembly is characterized by a transverse opening in the cylinder so that when the piston is partly withdrawn, gas bubbles can be drawn out of the repair liquid by the vacuum holding the cup in place against the glass. In operation, after the bubbles are removed from the liquid, the piston is moved toward the glass. The piston closes off fluid communication through the transverse opening in the cylinder and as it moves further toward the glass, it forces repair liquid into the damaged area. One end of the cylinder is provided with a sealing ring which bears against the face of the windshield to provide a seal. The cylinder is used as a reservoir for repair liquid, and allows gas bubbles to be removed from the liquid by the vacuum holding the cup in place. The piston has a pointed projection at its end which bears against a separated cone of glass in the damaged area and breaks the seal between the cylinder and the face of the windshield when pressure in the repair liquid approaches a level such that it is likely to cause permanent damage by delamination of the windshield.

3 Claims, 3 Drawing Figures

METHOD AND APPARATUS FOR WINDSHIELD REPAIR

BACKGROUND OF THE INVENTION

This invention relates to the repair of shatterproof glass laminates of the type used in automobile windshields, and particularly to an apparatus and method for repairing conical cracks or "pock marks" by the use of a chemical repair liquid.

Various devices and methods for repairing windshields by the use of chemical repair liquids are known. When a stone strikes a windshield, it frequently causes a cone-shaped piece of glass to separate from one of the glass laminations, thereby causing a conical crack or pock mark. In general, repair is accomplished by introducing a chemical repair liquid into the space surrounding the separated cone. The liquid polymerizes to form a solid which has an index of refraction very near that of the glass lamination. If the repair is accomplished successfully, the damage becomes very nearly invisible. Glass repair processes using repair liquids are popular because repairing a windshield is much less expensive than replacing it.

Methods of repairing windshields by the use of chemical repair liquids are described in the following U.S. Patents: Forler et al. No. 3,841,932; Sohl No. 3,562,366; Luhmann No. 3,988,400; Werner et al. No. 3,993,520; Story No. 4,132,516; Jacino No. 4,200,478; Petersen No. 4,249,869; Ogden et al. No. 4,165,397; Hollingsworth No. 3,765,975; Miller No. 4,032,272; and McCluskey et al. No. 4,047,863.

The most difficult problem in making a successful repair is the presence of gas bubbles in the repair liquid. These bubbles can be air or other dissolved gases. If they appear in the liquid before it is injected into the crack and are not removed, or if they appear as the liquid polymerizes in the crack, they may remain in the polymer permanently. A few small bubbles in the polymer will result in an unsatisfactory repair.

Werner et al. U.S. Pat. No. 3,993,520 describes a typical method of avoiding gas bubbles. Dissolved gas is removed from the repair liquid within a syringe by turning the syringe so that its needle points up, placing a rubber block over the end of the needle, and withdrawing the plunger to produce a vacuum. Bubbles are allowed to form within the syringe. With the needle still pointed upwardly, the rubber block is removed and the plunger is pushed upwardly to expel gas through the needle.

In accordance with Werner et al., gas is also removed from the liquid while the liquid is in the break in the glass itself. This is accomplished by withdrawing a plunger of a piston and cylinder device used to force liquid into the break.

Various other patents relating to windshield repair are concerned with the removal of gas from the repair liquid while the liquid is located in the conical crack being repaired. These U.S. patents include the Werner et al. patent as well as Hollingsworth No. 3,765,975; Ogden et al. No. 4,165,397; Jacino et al. No. 4,200,478; Petersen No. 4,249,869 and Story No. 4,132,516. While these patents are primarily concerned with removing bubbles from the chemical while it is in the conical crack, some of them disclose apparatus which is also capable of degasing the chemical before it enters the crack.

Miller U.S. Pat. No. 4,032,272 and McCluskey et al. U.S. Pat. No. 4,047,863 describe systems which use continuous vacuum pumps to evacuate enclosures which surround plunger assemblies and hold them in place on the windshield while the repair takes place. The plunger assemblies are used to force repair liquid into the area to be repaired.

The system of the Miller patent uses a vacuum to hold the plunger assembly in place and also to evacuate the crack before the repair liquid is introduced. However, the Miller system does not expose the repair liquid to the vacuum. Consequently, the vacuum in Miller does not effect degasing of the liquid.

In the McCluskey et al. patent, repair liquid is held in a temporarily constructed putty dam on the windshield, and a vacuum is applied to the enclosure surrounding the dam and the area to be repaired. Dissolved gas is removed from the liquid by the vacuum. Following the degasing of the liquid, a plunger assembly is installed in the cup, and is used to force the liquid from the dam into the conical crack.

The McCluskey system is similar to the Miller system in that it makes use of a continuously operating vacuum pump to hold the plunger assembly in place during the repair. It has the advantage over the Miller system that it enables the vacuum produced by the continuously operating pump to be used to degas the liquid before it enters the crack to be repaired. However, in order to accomplish this, it requires a separate dam to hold the liquid.

An improvement over the McCluskey and Miller systems has been developed in Canada by Duan Klettke. The Klettke improvement is described in U.S. Pat. No. 4,385,015, dated May 24, 1983. The Klettke improvement uses a continuous vacuum pump to hold a plunger assembly in place, and uses this same source of vacuum to effect degasing of the repair liquid before it enters the conical crack. It does not require a special dam to hold the liquid while it is being degased.

The present invention is an improvement over the systems of McCluskey and Klettke. Since it will be described as a modification to the Klettke system, it will be important to understand the structure of the Klettke apparatus and the method by which it is used.

The Klettke apparatus uses a vacuum cup similar to the one described in the McCluskey et al. patent. The vacuum cup is provided with a plunger and cylinder assembly for the injection of liquid into a conical crack. The cylinder assembly extends from an end wall of the cup to the opening of the cup, and is there provided with a seal positioned to engage the face of the glass being repaired and isolate the interior of the cup into two separate volumes, one being inside the cylinder, and the other being within the cup but outside the cylinder. The piston is threaded into the cylinder, and is removable so that repair liquid can be introduced into the cylinder. The cylinder itself acts as a dam or reservoir, holding a small quantity of repair liquid against the face of the glass. The piston is in sealing relationship with the interior wall of the cylinder, and is capable of forcing the liquid into the crack as the piston is moved toward the crack. A transverse hole is provided in the cylinder a short distance away from the sealing means at the end of the cylinder. This transverse hole provides fluid communication between the volume within the cylinder and the volume within the cup but outside the cylinder when the piston is retracted.

In operation, the Klettke assembly is placed over the area to be repaired so that the peak of the conical crack is centered underneath the end of the cylinder. Repair liquid is introduced into the opposite end of the cylinder, and the piston is threaded partway into the cylinder, but not so far as to cut off fluid communication through the transverse hole. A vacuum is then drawn on the interior of the cup by a continuous vacuum pump. Because the transverse hole is open, a vacuum is simultaneously drawn on the interior of the cylinder, and the effect of the vacuum is to remove dissolved gas from the repair liquid within the cylinder. The vacuum is allowed to act for a sufficient period of time to alloy all gas bubbles to reach the surface of the repair liquid. The piston is then moved downwardly to cut off fluid communication through the transverse opening in the cylinder and force repair liquid into the conical crack. The vacuum is maintained on the cup at this time to hold the cup, and the piston and cylinder assembly, against the windshield. After the liquid is introduced, the vacuum is released, the repair assembly is removed, and the repair area is finished off and polished in the conventional manner.

SUMMARY OF THE INVENTION

In the operation of the Klettke apparatus, as the piston forces repair liquid into the crack, a high pressure builds up in the liquid. Excessive pressure may cause delamination of the safety glass, and the appearance of a permanent "daisy" at the location of the damage. It is substantially impossible to repair the daisy. Consequently, when the daisy effect occurs in a windshield, it is necessary to replace the entire windshield.

The principal object of the present invention is to prevent the daisy effect from occurring in the operation of a repair device, such as that of Klettke, in which repair liquid is forced into the damaged area under high pressure by a piston and cylinder assembly.

In accordance with the invention, the end of the piston which is nearest the glass when the piston is in operation, is provided with a pointed projection. As the piston approaches the glass and pressure builds up in the repair liquid, the pointed projection enters the apex of the conical crack and bears against the apex of the separated cone of glass. As the piston continues to move forward relative to its cylinder, a force acting through the cone of glass, the pointed projection and the piston, breaks the seal between the cylinder and the glass and thereby relieves the pressure in the repair liquid before it can cause delamination of the safety glass.

Other objects of the invention will be apparent from the following detailed description when read in conjunction with the drawings.

DETAILED DESCRIPTION

Figure 1:
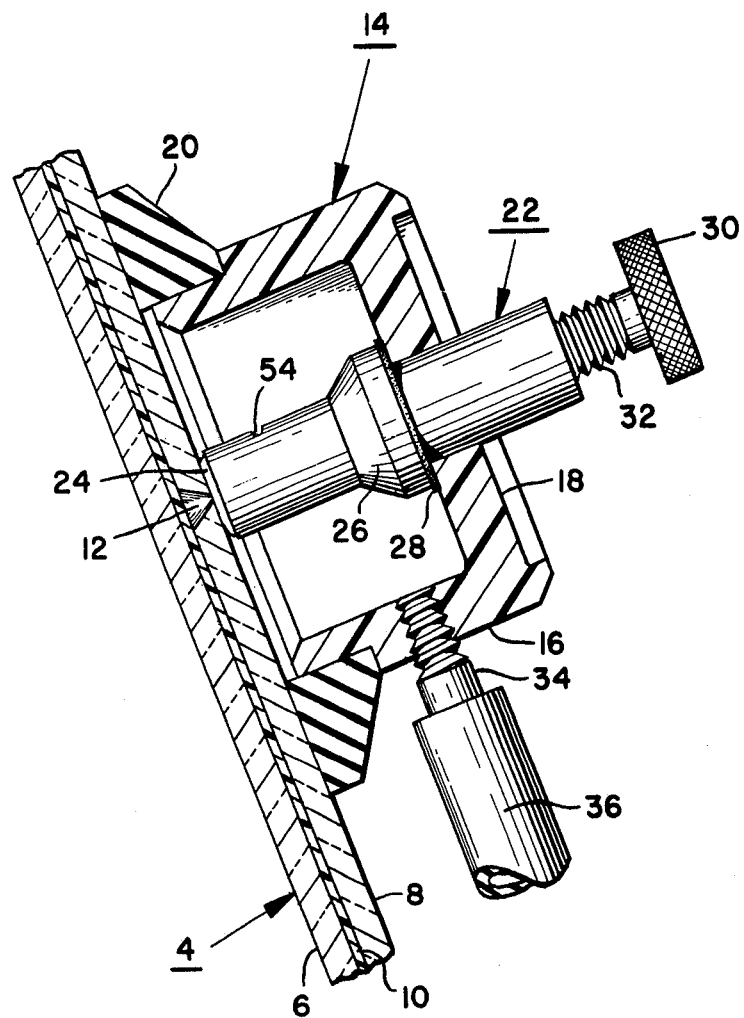
FIG. 1 is a vertical section taken through a plane perpendicular to an automobile windshield, showing the windshield with the Klettke repair apparatus in place.

FIG. 1 shows an automobile windshield 4 comprising an inner glass lamination 6, an outer glass lamination 8, and an internal synthetic resin lamination 10, which is typically a sticky substance such as polybutyral, which imparts a shatterproof characteristic to the windshield by preventing glass fragments from separating from the windshield and flying about as the result of the striking of the windshield by an object or as the result of the inertia of a collision.

As indicated above shatterproof windshields are frequently subjected to relatively minor damage in the form of pock marks or conical cracks. One such conical crack is indicated at 12. Typically, the crack results when the windshield is struck by a stone. Usually, a cone separates from the outer layer 8. The cone has its apex at the face of lamination 8, and its base at lamination 10.

The repair apparatus comprises a cup generally indicated at 14. This cup has a circular, cylindrical side wall 16, and an end wall 18. A circular seal 20 of rubber, or a synthetic rubber, surrounds the cup opening and is adapted to engage the glass lamination 8 to provide a gas-tight seal.

A piston and cylinder assembly generally indicated at 22 extends through wall 18, and is provided with a sealing ring 24 at the location of the cup opening. This sealing ring is flush with the face of seal 20, so that ring 24 and seal 20 can engage the face of glass lamination 8 simultaneously. The cylinder has an enlargement at 26, and a seal 28, of silicone cement or similar material, is provided in order to produce an air-tight seal about the location at which the cylinder assembly extends through wall 18 of the cup. The outer end of the piston, which is located within the cylinder, is provided with a knurled grip 30 so that it can be rotated manually. The upper end of the piston is also provided with threads 32 which engage internal threads (not shown in FIG. 1) inside the cylinder assembly to control the axial position of the piston.

A nipple 34 is threaded into side wall 16 of the cup, and is connected through flexible hose 36 to a motor-driven, continuously operable vacuum pump (not shown).

Figure 2:
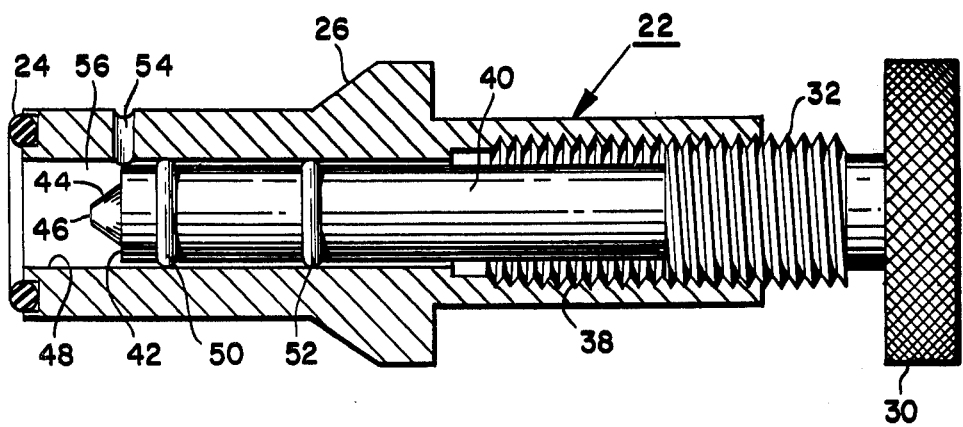
FIG. 2 is an axial section of the piston and cylinder assembly of the Klettke device modified in accordance with the invention by having a pointed projection at the end of the piston.

As seen in FIG. 2, the cylinder is tubular, having an internal passage extending from one end to the other but blocked by the piston. Threads 32 of the piston are in threaded engagement with internal threads 38 of cylinder 22. The main body 40 of the piston extends from the threaded portion to an end face 42. End face 42 is provided with a conical projection 44 having its apex 46 on the axis of the piston a short distance away from face 42. The piston is slidable within a cylindrical wall 48 which is engaged by synthetic rubber seals 50 and 52 which are carried by the piston in suitable grooves. A transverse opening 54 provides fluid communication between the exterior of the cylinder assembly and the space 56 to the left of seal 50 as viewed in FIG. 2.

Transverse opening 54 is also seen in FIG. 1. It is important that this opening be positioned at or near the top of the cylinder when the repair apparatus is in place on the windshield so that the repair liquid will not leak out of space 56.

In the operation of the apparatus shown in FIGS. 1 and 2, the apparatus is placed over the damaged area as shown in FIG. 1 with cylinder 22 centered on the apex of conical crack 12, and with the piston removed from the cylinder. The apex can be viewed through the barrel of the cylinder, if desired, for accurate alignment. The cup is manually held in place, and there is established in the cup a first volume bounded in part by the area of the glass within the circumference of sealing ring 24, and a second volume, within the cup but outside the cylinder, and bounded in part by the annular area of the glass between sealing ring 24 and seal 20.

While the repair assembly is held in place against the windshield, a repair liquid is introduced into the cylinder, preferably by means of a hypodermic syringe, or similar device. The repair liquid can be any one of a variety of well-known liquid pre-polymers. For example, the repair liquid can be a mixture consisting of 7 parts by weight of polyester acrylic resin mixture, 3 parts by weight of methyl methacrylate, 0.03 parts by weight of benzoyl peroxide, 0.15 parts by weight of benzoin, and 0.025 parts by weight of vinyl methoxysilane. Alternatively, the liquid can be glass repair formula PC 17 G available from SNG Laboratories, Inc., P.O. Box 383, Fort Washington, Pa.

After the repair liquid is introduced into the cylinder, the piston is replaced in the cylinder, and threads 32 are engaged with threads 38 (FIG. 2), and grip 30 is rotated clockwise several turns. The piston is positioned, however, so that seal 50 is short of transverse opening 54. A vacuum is applied by activating the pump connected to vacuum hose 36. Once the vacuum is applied, it is no longer necessary to hold the repair assembly manually against the windshield. The vacuum is maintained for a period of time sufficient to effect substantially complete degasing of the repair liquid within space 56 inside the cylinder. The time required depends on the amount of dissolved gas and also upon the viscosity of the repair liquid. Several minutes may be required before complete degasing takes place.

The amount of repair liquid injected into space 56 should be carefully controlled. Opening 54 is preferably positioned so that, as the piston moves toward the end of the cylinder, and sealing ring 50 approaches opening 54, the liquid is not forced out of opening 54. However, opening 54 should not be positioned so far away from the end of the cylinder that a substantial quantity of gas is trapped and redissolved in the repair liquid as the piston moves inwardly after fluid communication through opening 54 is cut off by sealing ring 50.

As the piston moves forward, it forces repair liquid into the conical crack, and when a sufficient quantity of repair liquid is introduced into the crack, the vacuum can be cut off, and the repair assembly removed so that curing of the repair liquid and final finishing of the repair can take place by conventional methods.

Figure 3:
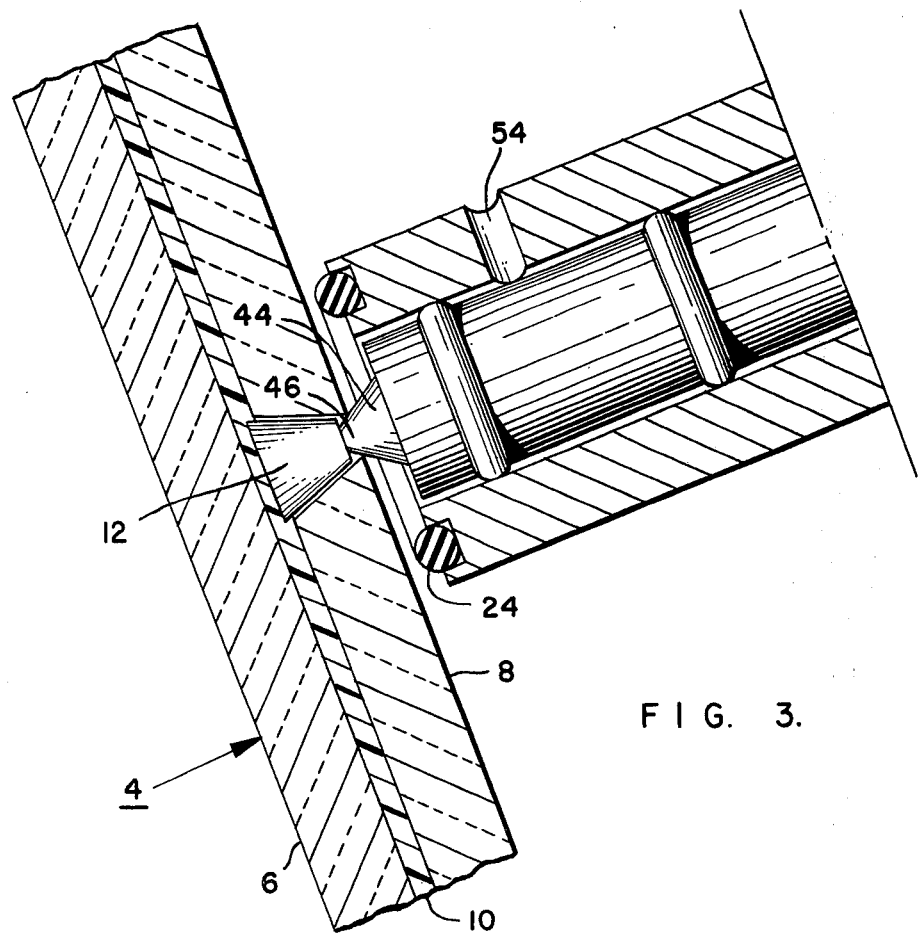
FIG. 3 is a detailed sectional view taken on the vertical plane through an automobile windshield illustrating the operation of the projection at the end of the piston.

As pointed out above, excessive fluid pressure applied to the area of the damage can cause delamination of the windshield, with the result that a "daisy" effect is produced. When this occurs, it is usually impossible to repair the windshield, and it must be replaced. To prevent the "daisy" effect from occurring, apex 46 of cone 44 engages cone 12 of the glass as shown in FIG. 3 before pressure in the repair liquid builds up to the point where delamination can occur. Cone 12 is pushed into lamination 10, and the force acting through cone 44 and the piston causes seal 12 to break away from the face of glass lamination 8. This immediately releases the pressure on the repair liquid, since the space outside of the cylinder is still under vacuum. When the vacuum is released, and the repair assembly removed, the damaged area is still filled with repair liquid, and is finished off to produce a good repair. Since cone 44 only comes into contact with glass cone 12 which is already part of the damaged area, and does not contact the face of glass lamination 8, it serves its purpose without causing any further damage to the windshield.

This invention is useful in repairing most pock marks which occur in windshields, and is very effective in preventing the "daisy" effect from occurring as a result of high pressure in the repair liquid. The invention can only be used, however, where the structure of the pock mark is such that the projection at the end of the piston can bear against the separated glass cone. There are certain types of damage for which a piston with a cone or other projection at its end is not suitable. For these types of damage, a piston without the cone is used.

This invention enables high quality repairs of shatterproof windshields to be made rapidly and reliably. The apparatus used is structurally very simple.

The invention is applicable to a variety of devices for forcing repair liquids into conical cracks under high pressure. Thus the apparatus can be modified in various respects. For example, if desired, the cylinder assembly can be threaded into the wall of the cup to provide for relative adjustment between the cylinder assembly and the cup. If this is done, however, it is important to insure that, when the repair apparatus is in place on the windshield, the opening corresponding to opening 54 is positioned on the upper part of the cylinder so that repair liquid does not flow outwardly through it. Where the cylinder is adjustable relative to the cup, it is desirable to make the cup or at least part of the cup transparent so that the position of the transverse opening in the cylinder can be readily determined.

The projection at the end of the piston need not be conical and can be of any desired shape so long as it has a point adapted to bear against the separated cone of glass in the damaged area.

Various other structural modifications can be made in the seals, the support for the piston and cylinder assembly, the cylinder, the piston, and various other components of the device as well as in the method of its operation without departing from the scope of the invention as defined in the following claims.

I claim:

1. A method of repairing a conical crack in shatterproof glass comprising the steps of establishing an enclosed volume bounded in part by an area on the glass surrounding the crack and in part by a piston and cylinder assembly, an end of the cylinder being provided with a seal against the face of the glass, introducing a repair liquid into said volume and forcing said repair liquid under pressure into said crack by moving the piston of said piston and cylinder assembly toward said crack, characterized by the step of relieving the pressure on said repair liquid by forcing a pointed projection on an end of the piston against the apex of a separated cone of glass in the crack and breaking the seal between the end of the cylinder and the glass by applying to the cylinder a force which is a reaction to the force of the pointed projection against the cone of glass.

2. Apparatus for the repair of a conical crack in shatterproof glass comprising: means defining a cylinder, piston means slidable in the cylinder along the axis thereof, first means providing a seal between the piston means and the inner wall of the cylinder, second means, at one end of the cylinder, for providing a seal between the end of the cylinder-defining means and the face of a sheet of shatterproof glass, whereby the piston means is able to force a repair liquid within said cylinder into a conical crack in said sheet of shatterproof glass, means for applying a force to said cylinder-defining means for urging said second seal-providing means against the face of said sheet of shatterproof glass, and means for limiting the pressure in the repair liquid within said cylinder, in which said pressure limiting means comprises a pointed projection extending axially from the end of the piston means nearest the end of the cylinder having the seal, said pointed projection being connected to the piston means and being positioned to be pushed positively by the piston means against the apex of a separated cone within the conical crack when the piston means is extended toward the face of the sheet of shatterproof glass, and having means, directly connected to said piston means, for providing a force for urging the piston means in an axial direction toward the sheet of shatterproof glass, said urging means being interconnected with the cylinder-defining means and capable of providing an opposite force sufficient in magnitude to overcome the force urging the second seal-providing means against the face of said sheet and thereby break the seal between the end of the cylinder-defining means and the face of said sheet when the pointed projection bears against the apex of said separated cone.

3. Apparatus according to claim 2 in which the piston is threaded into the cylinder.

* * * * *

Disclaimer 4,419,305.—*William B. Matles,* Philadelphia, Pa. METHOD AND APPARATUS FOR WINDSHIELD REPAIR. Patent dated Dec. 6, 1983. Disclaimer filed Dec. 2, 1983, by the assignee, *Glass Medic, Inc.*

Hereby enters this disclaimer to the entire term of said patent.

[*Official Gazette February 14, 1984.*]